Sept. 18, 1934.  W. M. HICKS  1,974,026

DEVICE FOR MEASURING VACUUM IN SEALED CONTAINERS

Filed July 29, 1932  2 Sheets-Sheet 1

Inventor
Walter M. Hicks
By Mason, Fenwick & Lawrence
Attorneys

Sept. 18, 1934.  W. M. HICKS  1,974,026
DEVICE FOR MEASURING VACUUM IN SEALED CONTAINERS
Filed July 29, 1932  2 Sheets-Sheet 2
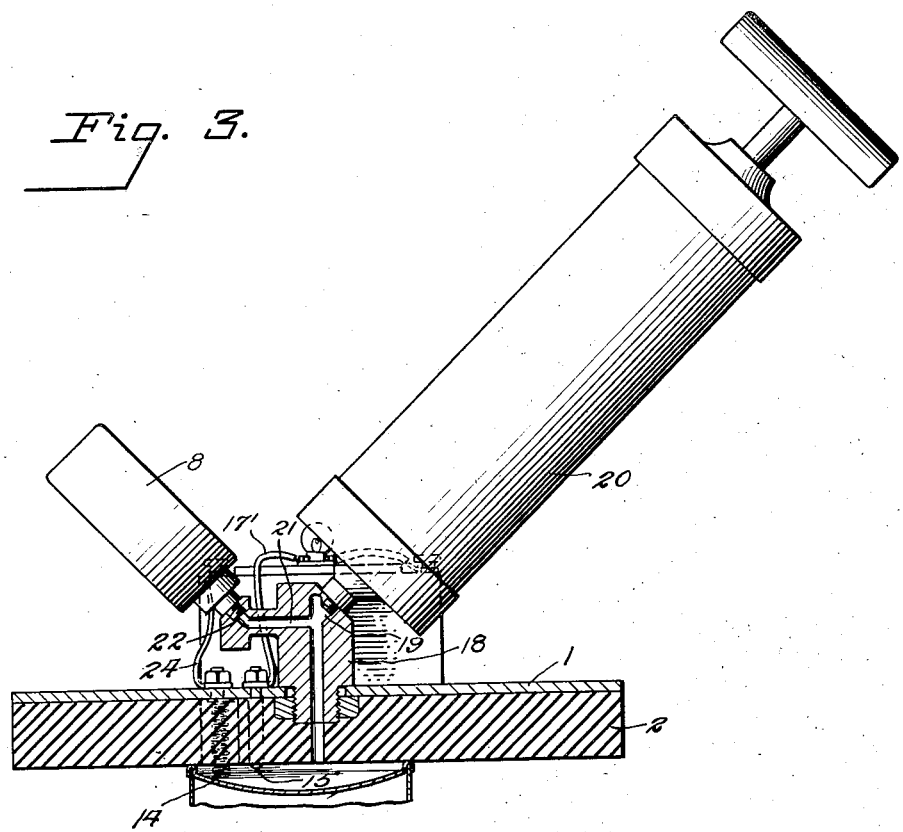
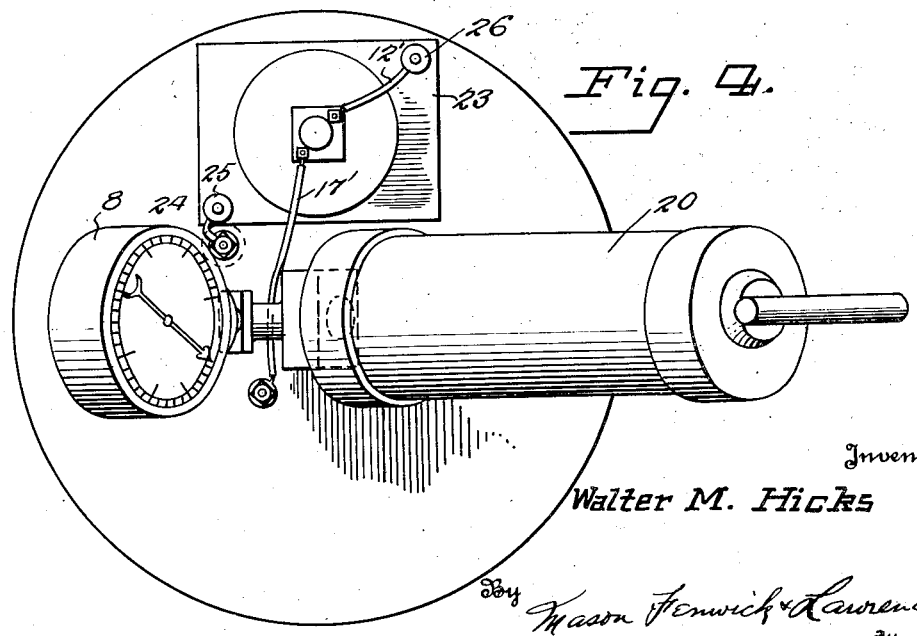
Inventor
Walter M. Hicks Patented Sept. 18, 1934

1,974,026

UNITED STATES PATENT OFFICE 1,974,026

DEVICE FOR MEASURING VACUUM IN SEALED CONTAINERS

Walter M. Hicks, Fennville, Mich.

Application July 29, 1932, Serial No. 626,114

1 Claim. (Cl. 73—51)

This invention relates to a portable device for measuring the vacuum or negative pressure in hermetically sealed tin containers.

In the canning industry it is customary to pack perishable foodstuffs in tin containers which are, ordinarily, formed of a cylindrical body provided with end closures. The food stuff is commonly sterilized in the container and the top closure sealed in place while the contents are at a high sterilizing temperature. As a consequence when the contents of the can cool and contract a partial vacuum is produced in the can, such air or gases as are present being thoroughly sterilized. This negative pressure is ordinarily sufficient to cause the end closures of a container to bulge inwardly to a slight extent. The efficiency of the canning operation depends to a large extent upon the obtaining of this partial vacuum for if the seal is imperfect, non-sterile air will gradually leak into the container thus reducing the vacuum and this non-sterile air will cause deterioration and spoiling of the contents of the can. It is thus recognized in the art that if the vacuum in the sealed container can be gauged accurately the success of the canning operation may be determined and by the elimination of cans showing an insufficient vacuum a uniform product can be produced.

Quite elaborate machines have been developed for thus testing the cans but these are not available to small canneries by reason of their expense and the seasonable character of canning operations as commonly practiced. A small portable device is also known in the art consisting of a gauge associated with a tubular blade over which is positioned a rubber gasket which is operated by thrusting the tubular blade through the tin of a can and thus permitting a direct registry of the vacuum within the can on the gauge. This device while simple and cheap is, of course, objectionable in that it spoils each can tested and is only useful to the extent that it indicates that an entire batch is probably bad.

The object of the present invention is to provide a very simple, inexpensive and reasonably accurate instrument adapted to portable use and of a type which will not injuriously affect the can being tested, so that if the can tested shows the proper vacuum it remains uninjured as a result of the test.

The invention consists in the novel construction, arrangement and combinations of parts hereinafter more particularly described and claimed.

Two sheets of drawings accompany this specification as part thereof in which like reference characters indicate like parts throughout.

Figure 3 is a side elevation of a modified form of the device partly broken away and shown in cross section; and Figure 4 is a top plan view of the device of Figure 3.

Figure 1:
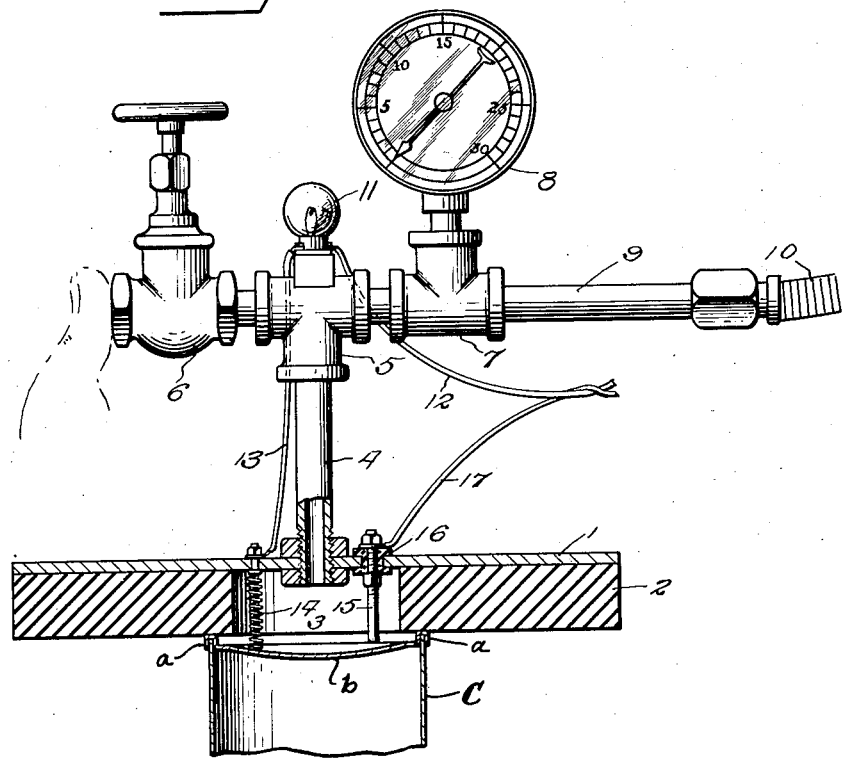
Figure 1 is a side elevation of an improved device applied to a can, parts being broken away and shown in cross section.
Figure 2:
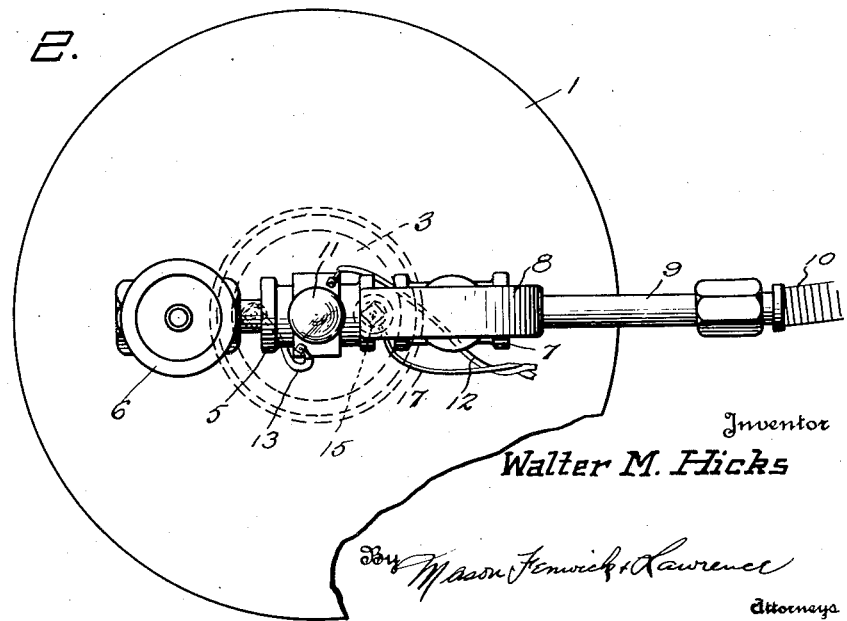
Figure 2 is a top plan view partly broken away.

In accordance with the present invention a plate 1, which may be conveniently of circular shape and slightly larger in diameter than the maximum size cans to be tested, is provided on its bottom face with an annular elastic gasket 2 having its central hole 3 positioned centrally of plate 1.

A short tubular member 4 is positioned centrally of plate 1 providing a conduit communicating with the hole 3 of gasket 2 and upon the upper end of the tubular member 4 is positioned a T 5 with one end of which is associated a valve 6 and with the other arm is associated a second T 7 to which is connected a negative pressure gauge 8 and a connecting tube 9 adapted to be associated to a suitable source of negative pressure by means of a tube 10.

An indicating device herein illustrated as an electric light bulb 11 may be conveniently mounted upon the T member 5 and this electric bulb 11 is in circuit with electric conductors 12 and 13, which with conductor 17 are adapted to complete a circuit with a source of electric energy not shown.

Upon plate 1 are mounted two electric contact members 14 and 15, one of these contacts 14 being preferably resilient and adapted to extend within the hole 3 of gasket 2 substantially the depth of the gasket in its normal and uncompressed condition. The other contact 15 is preferably rigid and adjustable with respect to plate 1 as by having one end threaded to co-mate with a threaded orifice in a bushing 16 so that this contact 15 may be adjusted toward and away from the lower face of plate 1.

The modified form of the device illustrated in Figures 3 and 4 shows a hand pump 20 directly mounted upon a casting 18 which is adapted to provide support for gauge 8 and also for the conduit 19 extending from the pump to the lower face of gasket 2 and also to the gauge 8 as at 22. In this form of the device a battery 23 is mounted upon plate 1 with the light or signal positioned on the top of the battery and connected to the poles 25—26 thereof by conductors 12', 17' and 24.

Experience indicates that cans constructed of different weight metal and in different diameters will show a varying buckling resistance with respect to the tops as indicated by the following table, in which the dial readings are expressed in mercury inches:

| Can No. | Diameter | Deductions or allowance |
|---|---|---|
| | Inches | |
| 1 | $2\frac{1}{16}$ | 4 to 5 inches on the dial. |
| 2 | $3\frac{7}{16}$ | 4 to 4½ inches on the dial. |
| 2½ | 4 | 3½ to 4 inches on the dial. |
| 10 | $6\frac{3}{16}$ | 2 to 3 inches on the dial. |

These allowances must be deducted from the reading of the gauge if the gauge used is not calibrated for the specific cans being tested and this will not generally be done, as in ordinary practice several types of cans are likely to be used in the same plant. By the use of this table, however, it will be very simple to use the device effectively with a wide variety of cans by making the necessary computation and deducting the initial pressure necessary to offset the buckling resistance of the particular can top.

In operation the use of the improved apparatus is quite simple. The can C to be tested is placed on a table or the like and gasket 2 lowered upon the top of the can so that the rim $a$, formed by clinching the top $b$ over the cylinder of the can, engages the lower face of the gasket surrounding the central hole 3. In this position the compression contact 14 will engage the top of the can $b$ and the rigid contact 15 will have been properly adjusted with respect to the top plate 1 for the particular size can to be tested. At this point the negative pressure or suction is opened through conduits 9 and 10 and when a sufficient negative pressure has been developed in hole 3 to cause the can top $b$ to buckle upwardly, rigid contact member 15 will engage the can top $b$ and thus complete an electric circuit through lamp 11 which will light. At this point the operator will observe the gauge 8 and from the negative pressure indicated at that moment will deduct the pressure indicated by the table as the buckling resistance for the top of a can of the size being tested, the remainder being the negative pressure within the can C. By opening valve 6 the pressure is quickly released permitting removal of the can.

Various modifications will readily suggest themselves to those skilled in the art but within the scope of the present invention as claimed.

Having thus fully described my invention, I claim:

A portable device for testing cans comprising a plate, an annular gasket mounted on one face of the plate, a pedestal centrally mounted on the plate opposite the gasket having a conduit passing through said pedestal centrally of the gasket, electrical contacts mounted on the plate and extending through the central aperture of the gasket to a predetermined extent, indicator means carried by the plate in electrical circuit with said contacts, pressure gauging means carried on the pedestal in communication with the conduit therethrough and means communicating with said conduit for evacuating the same.

WALTER M. HICKS.